United States Patent

[11] 3,627,741

[72] Inventors Luigi Patron;
 Sergio Lo Monaco, both of Venezia, Italy
[21] Appl. No. 662,314
[22] Filed Aug. 22, 1967
[45] Patented Dec. 14, 1971
[73] Assignee Monsanto Company
 St. Louis, Mo.

[54] POLYMERIZATION PROCESS FOR PRODUCING UNIFORM ACRYLONITRILE POLYMERS USING CHLORATE/SULFOXY REDOX INITIATORS AND AMINO POLYACIDS OR SALTS THEREOF
 7 Claims, No Drawings

[52] U.S. Cl........................................................ 260/85.5,
 260/29.1, 260/29.6, 260/30.8, 260/32.6, 260/47,
 260/63, 260/78.5, 260/79.3, 260/88.7
[51] Int. Cl.......................................................... C08f 3/76,
 C08f 15/22
[50] Field of Search........................................... 260/85.5,
 85.5 D, 88.7, 85.5 L, 85.5 N

[56] References Cited
 UNITED STATES PATENTS

| | | | |
|---|---|---|---|
| 2,751,374 | 6/1956 | Cresswell........................ | 260/85.5 D |
| 2,840,550 | 6/1958 | Price et al........................ | 260/85.5 D |
| 3,123,588 | 3/1964 | Lunney........................... | 260/85.5 R |
| 3,135,722 | 6/1964 | Logemann....................... | 260/85.5 R |
| 3,141,869 | 7/1964 | Dennstedt....................... | 260/85.5 R |
| 3,200,100 | 8/1965 | Dennstedt....................... | 260/85.5 R |
| 2,673,192 | 3/1954 | Hill................................. | 260/88.7 |
| 2,847,405 | 8/1958 | Mallison......................... | 260/88.7 |
| 3,012,997 | 12/1961 | Kocay............................. | 260/88.7 |

*Primary Examiner*—Harry Wong, Jr.
*Attorneys*—James W. Williams, Jr. and Russell E. Weinkauf

ABSTRACT: The use of additive compounds such as ethylenediamine tetracetic acid, diethylenetriaminepentaacetic acid and nitrilotriacetic acid and their water-soluble salts has been found to enhance the uniformity of the polymerization of vinyl monomers when initiated by a redox catalyst system comprising chlorate ions and reducing sulphoxy ions at pH below about 4.

POLYMERIZATION PROCESS FOR PRODUCING UNIFORM ACRYLONITRILE POLYMERS USING CHLORATE/SULFOXY REDOX INITIATORS AND AMINO POLYACIDS OR SALTS THEREOF

The present invention relates to a process for the preparation of vinyl polymers.

More particularly, this invention relates to an improved process for the polymerization of vinyl compounds using a redox catalytic system constituted by chlorate ions and sulfoxy ions, in order to obtain polymers having a high degree of whiteness, excellent thermal stability and good, uniform dyeability with basic dyes.

The polymerization of vinyl compounds, particularly acrylonitrile alone and with other ethylenically unsaturated monomers copolymerizable therewith, in an aqueous medium at pH not greater than 4, using as catalyst a redox system of chlorate ions activated by reducing sulfoxy ions, is well known in the art.

Even though polymerization employing this initiator system is quite satisfactory with respect to yields, there have been difficulties with regard to the control of the polymerization. That is, the polymerization rates and the conversions vary during the course of the polymerization. Furthermore, it has proved to be difficult to control and maintain constant the mean molecular weight and the distribution of the molecular weight of the polymer, as well as to maintain uniform dyeability. It has been noted that, at equal viscosity and constant concentrations of the activator and of the catalyst, the dyeability of the polymer obtained varies. Further, in some instances, the polymer produced is neither as white as is desired nor is it resistant to discoloration by heat.

These drawbacks are serious where the polymers are used in the production of synthetic fibers since the requirements of the textile industry are such that a nonuniformly dyeable fiber having poor heat stability and which is not perfectly white is not competitive in the marketplace.

Efforts have been made to overcome such drawbacks. For example, variation of the ratio between the molar equivalents of chlorate and the polymerizable monomers with or without a concurrent variation of the ratio between the molar equivalents of sulfoxy ions and the monomer has been investigated. These expedients do not, however, overcome drawbacks, such as the control and the distribution of the molecular weight of the polymer thus formed, and they do not result in any improvement in the color of the polymer, its heat stability or its dyeability.

The object of this invention is to provide a reproducible process for the preparation of vinyl polymers in high yields. More particularly, it is an object of this invention to provide a reproducible process for the preparation of polymers of acrylonitrile and copolymers thereof containing at least about 80 percent acrylonitrile having constant mean molecular weight, an exceptional degree of whiteness and improved heat stability, which polymers are suitable for the manufacture of while fibers or filaments having excellent heat resistance and good, constant and homogeneous basic dyeability.

These and other objects of the invention are provided by a process for polymerization of vinyl monomer, particularly of acrylonitrile alone or with other monomers copolymerizable therewith, in an aqueous medium at pH not exceeding about 4.0 in the presence of redox catalyst system comprising chlorate ions and reducing sulfoxy ions, in the presence of an amino polyacid or additive compound selected from the group consisting of ethylenediaminetetraacetic acid, diethylenetriaminepentaacetic acid, nitrilotriacetic acid and their water-soluble salts.

The amino polyacids, if present during the polymerization of vinyl compounds with redox catalyst systems comprised of persulfate ions and a reducing sulfoxide agent, act as polymerization inhibitor. In contrast, when used according to the instant invention they considerably improve the polymer physical properties, especially color and heat sensitivity, and result in more uniform rates of polymerization.

Among the water-soluble salts of the ethylenediaminetetraacetic acid, diethylenetriaminepentaacetic acid and nitrilotriacetic acid, suitable in the process of this invention, are the di-, tri- and tetra-sodium and potassium salts, the mono and bicalcium and magnesium salts, the di-, tri- and tetra-ammonium salts as well as also the mixed salts of such compounds. Preferred are the ammonium salts and water-soluble salts of metals of Groups Ia and IIa of the periodic chart of elements found in H. G. Dening's Fundamental Chemistry, 2nd Ed., John Wiley and Sons, Inc., New York (1947).

Examples of water-soluble salts of these acids include bisodium ethylenediaminetetraacetate, trisodium ethylenediaminetetraacetate, tetrasodium ethylenediaminetetraacetate and the corresponding potassium and ammonium salts; monocalcium ethylenediaminetetraacetate, dimagnesium ethylenediaminetetraacetate, tripotassium diethylenetriaminepentaacetate, pentasodium diethylenetriaminepentaacetate, calcium tripotassium diethylenetriaminepentaacetate, trisodium nitrilotriacetate, monopotassium nitrilotriacetate, sodium calcium nitrilotriacetate, and the like.

The quantity of ethylenediaminetetraacetic acid, diethylenetriaminepentaacetic acid, nitrilotriacetic acid or one of their water-soluble salts, which is added to the reaction mixture, generally lies between 0.0001 percent and 5 percent based on the weight of the monomers, preferably between 0.005 percent and 0.05 percent. Increased concentrations of the amino polyacids may be employed but do not result in further advantages. Instead, there would be only an increase of the cost of the process due both to the greater consumption of the amino polyacids as well as to the difficulties that arise in separation and purification of the polymer.

As above indicated the redox catalyst system used in the process of this invention comprises chlorate ions activated by reducing sulphoxy ions. The term reducing sulfoxy ions means the sulfite, bisulfite, or hydrosulfite ions and in general sulfur compounds in the form of ions or capable of forming ions in the polymerization medium in which the valency of the sulfur is not higher than 4. These reducing sulfoxy ions constitute a preferred group of reducing compounds, but it must be understood that the present invention is not limited only to the use of this group.

The ionic components of the redox catalyst system may be introduced into the reaction medium in their acid forms, for example, chloric acid and sulfurous acid; however, insofar as these acids are relatively unstable, it is preferred to use the corresponding water-soluble salts together with an appropriate acid such as sulfuric acid, hydrochloric acid, nitric acid, and the like. For this reason, the chlorate ions may be conveniently supplied as ammonium chlorate, alkaline chlorates or other water-soluble chlorates of alkaline-earth metals or heavy metals, while the reducing sulfoxy ions are conveniently supplied as sulfur dioxide, or sulfite, bisulfite, metabisulfite salts of ammonia, alkali metals, alkaline-earth metals or other heavy metals provided that the corresponding salts are water soluble. Water-soluble esters such as dialkyl sulfites, such as diethyl sulfite and the like may also be used.

The polymerization may be conducted by batch, semicontinuous or continuous techniques, the latter being preferred. The polymerization is carried out while the monomer or the mixture of vinyl monomers to be polymerized are dissolved or dispersed in an aqueous medium at pH not exceeding 4, and preferably between 2 and 3.5.

The quantity of chlorate ions present in the reaction medium lies between about 0.1 and about 2 percent based on the weight of the monomers present, while the quantity of reducing sulfoxy ions must be such that the catalyst activator ratio is less than 1:6, preferably between 1:8 and 1:12.

Relatively low-polymerization temperatures are desirable and generally lie between 20° and 70° C. In practice, however, the best results are obtained by keeping the temperature of polymerization within the range of from about 40° to 60° C.

It is advisable to conduct the polymerization in the absence of oxygen to avoid its inhibiting effect on the polymerization. Suitable inert gases, such as nitrogen or carbon dioxide, may be employed for removing the air from the polymerization reactor.

This invention may be applied to any vinyl monomer which polymerizes by addition and which contain mono ethylene unsaturation represented by the group >C=C<. Examples of this class of monomers include the aryl-olefins, such as styrene, chlorostyrene, p-methoxy-styrene, vinylnaphthalene and the like; acrylic acid and substituted acrylic acids, their esters, nitriles and amides such as acrylic acid, methacrylic acid, methlacrylate, ethyl acrylate, isobutyl acrylate, methyl alpha-chloracrylate, methyl methacrylate, ethyl methacrylate, butyl methacrylate, ethyl ethacrylate, isoamyl acrylate, methacrylonitrile and methacrylamide; methyl isopropenyl ketone, methyl vinyl ketone, methyl vinyl ether, vinylidene chloride; vinyl pyridine; vinyl acetate, vinyl chloride, vinyl furane; vinyl carbazol; esters of fumaric acid; diallyl maleate, vinyl acetylene and other monoethylenically unsaturated monomers copolymerizable with acrylonitrile known to those skilled in the art. These vinyl monomers may be used alone or in combination for the purpose of forming homopolymers and interpolymers.

This invention is particularly applied to the polymerization of acrylonitrile alone or in admixture with other monoethylenically unsaturated monomers copolymerizable therewith.

Examples of monoethylenically unsaturated monomers copolymerizable with the acrylonitrile include, alkyl, aryl and cycloalkyl acrylates; alkyl, aryl and cycloalkyl methacrylates; acrylamide and the corresponding alkyl derivatives; unsaturated ketones; vinyl esters such as vinyl acetate; vinyl ethers; styrene and its alkyl derivatives, and vinyl halides, such as vinyl chloride and vinyl bromide.

In case it is desired to further improve the dyeability of the polymers with basic dyes, it is possible to add to the reaction mixture a comonomer having an acid function available for the fixing of the basic dyes. Examples of such acidic comonomers are itaconic acid, cinnamic acid, sulfocinnamic acid, maleic acid or its anhydride, sulfonic acids having an ethylenically unsaturated bond, such as allyl- and methallyl sulfonic acid, allyloxyethylsulfonic acid, methallyloxyethylsulfonic acid, allylthioethylsulfonic acid, isopropenylbenzenesulfonic acid, vinyl bromobenzene sulfonic acid, vinylfluorobenzenesulfonic acid, vinylethylbenzenesulfonic acid and the like; vinyldichlorobenzenssulfonic acid, acetylethylenesulfonic acid, and the like; N-p-sulfophenyl-methacrylamide, p-sulfophenyl sulphophenyl methallyl ether and the like. The water-soluble salts of such monomers may be employed in like manner.

The polymer and copolymers of this invention may be transformed into fibers or filaments by dry or wet-spinning techniques starting from solutions of said polymers in any well-known solvent for acrylic polymers, such as N,N-dimethylacetamide; N,N-dimethylformamide, ethylene carbonate, dimethylsulfoxide, and aqueous solutions of sodium thiocyanate, zinc chloride, lithium bromide and the like.

The basic dyeability of the acrylonitrile polymers prepared according to this invention was measured using Sevron Blue 2G dye. The procedure consists of mixing a buffered solution (pH 5.4) of the dye (about 7 grams/liter) with the polymer sample in a sealed tube at 100° C. for 2 hours. The polymer was then removed from the tube, filtered, washed and the filtrate analyzed spectrophotometrically to determine the amount of dye remaining in the solution to thereby determine the percentage of the dye taken up by the polymer. The percentage is recorded as Basic Dyeability in tables I and II below.

The dyes suited for being used for the polymeric compositions of this invention are many and well known to those skilled in the art.

Among these dyes are preferred: Sevron Blue 2G, C.I. Basic Blue 22, Sevron Brilliant Red 3B, C.I. Basic Violet 15, Sevron Brilliant Red 2G, C.I. Basic Red 14, Sevron Red GL, C.I. Basic Red 18, Sevron Yellow R, C.I. No. 48055, Sevron Blue B, C.I. Basic Blue 21 and many others.

In order to more clearly illustrate the practice of this invention the following examples are given hereunder.

EXAMPLE 1

Three samples of acrylonitrile polymers $A_1$, $A_2$ and $A_3$ are prepared by polymerizing the acrylonitrile in a 3-liter polymerization reactor into which are continuously fed acrylonitrile, an aqueous stream containing 0.3 percent by weight, based on the monomers, of $NaClO_3$ catalyst, and an aqueous stream containing 1.5 percent by weight with respect to the monomers, of $SO_2$, the activator being partially neutralized with $NaHCO_3$ until a pH of about 3 is attained.

The polymerization temperature is maintained constant at about 50° C. and the ratio between the quantity of fed water and the fed monomers is 5.

The aqueous suspension of the obtained polymer is discharged, from an overflow pipe, filtered and repeatedly washed with water, with acetone and then again with water to remove all foreign substances and unreacted monomers. The polymer thus obtained is then dried in an oven at 80° C. for 12 hours.

Subsequently three other samples of acrylonitrile polymers ($B_1$, $B_2$ and $B_3$) are prepared by operating under the same conditions as specified above wherein addition feeds comprising aqueous solution containing, respectively 0.01; 0.10; and 0.50 percent by weight based on the monomers of ethylenediaminetetraacetic acid were fed to the reaction.

Three other samples of acrylonitrile polymers ($C_1$, $C_2$ and $C_3$) are prepared by operating under the same conditions as specified above together with aqueous solutions containing, respectively 0.01, 0.10 and 0.50 percent by weight based on the monomers, of nitrilotriacetic acid.

The following tests were carried out on all of the polymer samples thus prepared:

intrinsic viscosity $[\eta]$ in dimethylformamide in deciliters per gram, on which is calculated the molecular weight (M) on the basis of the Cleland and Stockmayer formula:

$$[\eta]=2.33\times10^{-4}\times M^{0.75};$$

conversion expressed as a percentage by weight of polymer obtained with respect to the weight of the monomers fed in;

color of the polymer measured by General Electric Integrator Spectrophotometer;

heat stability established by heating the copolymers for 8 hours at 145° C.

The variation of color between the starting polymers and those heated was measured by a General Electric Integrator Spectrophotometer.

The results of these tests, carried out on each polymer, were recorded on the following table I.

TABLE I

| Sample | Ethylene-diamine-tetraacetic acid, percent | Nitrilo-triacetic acid | $[\eta]$ Intrinsic viscosity | Conversion | Basic dyeability | Original color | | Heat-sensitivity | |
|---|---|---|---|---|---|---|---|---|---|
| | | | | | | Purity Index | Brightness | $\Delta PI$ | $\Delta B$ |
| $A_1$ | | | 0.138 | 70.2 | 11.9 | 98.6 | 95.2 | 10.2 | 9.8 |
| $A_2$ | | | 0.161 | 69.8 | 10.2 | 98.9 | 94.8 | 10.1 | 10.2 |
| $A_3$ | | | 0.142 | 70.0 | 11.8 | 98.7 | 94.9 | 11.2 | 11.4 |
| $B_1$ | 0.01 | | 0.151 | 70.2 | 11.1 | 99.6 | 96.2 | 8.2 | 8.4 |
| $B_2$ | 0.10 | | 0.152 | 70.3 | 11.1 | 99.5 | 96.0 | 8.6 | 8.8 |
| $B_3$ | 0.50 | | 0.151 | 70.2 | 11.2 | 99.6 | 96.1 | 8.1 | 7.9 |
| $C_1$ | | 0.01 | 0.150 | 70.2 | 11.2 | 99.6 | 96.0 | 8.2 | 8.1 |
| $C_2$ | | 0.10 | 0.151 | 70.3 | 11.1 | 99.5 | 96.1 | 8.0 | 7.9 |
| $C_3$ | | 0.50 | 0.152 | 70.2 | 11.1 | 99.6 | 96.1 | 8.1 | 8.4 |

As can be seen from table I, where the polymerization of the acrylonitrile is carried out in the absence of ethylenediaminetetraacetic acid of nitrilotriacetic acid, the polymers obtained show different viscosities and different molecular weight, different dyeability and different original color and heat sensitivity.

On the other hand, polymers prepared in the presence of ethylenediaminetetraacetic or nitrilotriacetic acid were more uniform with regard to both viscosity and dyeability, moreover, the original color and heat sensitivity were considerably improved.

Similar results are obtained when diethylenetriaminepentaacetic acid or one of its hydrosoluble salts is used.

EXAMPLE 2

Two sets of samples of acronitrile copolymers ($D_1$, $D_2$ and $E_1$, $E_2$) were prepared by polymerizing, according to the procedures described in example 1, a mixture of monomers comprising 91 percent by weight of acrylonitrile and 9 percent by weight of methacrylate. Samples $E_1$ and $E_2$ were prepared in the presence of ethylenediaminetetraacetic acid. No amino polyacid was employed in the preparation of samples $D_1$ and $D_2$.

The same tests as those specified in example 1 were carried out on samples $D_1$, $D_2$, $E_1$ and $E_2$ and results were then recorded on table II.

EXAMPLE 3

Samples of acrylonitrile copolymers, $F_1$ and $F_2$, $G_1$ and $G_2$ were prepared by polymerizing, according to the procedures specified in example 1, a mixture of monomers comprising 91 percent by weight of acrylonitrile and by 9 percent by weight of vinylacetate. Samples $G_1$ and $G_2$ were prepared in the presence of ethylenediaminetetraacetic acid. No amino polyacid was employed in the preparation of samples $F_1$ and $F_2$.

The same tests as those specified in example 1 were carried out on samples $F_1$, $F_2$, $G_1$ and $G_2$ and the results were reported on table II.

EXAMPLE 4

Samples of acrylonitrile copolymers, $H_1$, $H_2$ and $L_1$, $L_2$ were prepared by polymerizing according to the procedures specified in example 1, a mixture of monomers comprising 90.5 percent by weight of acrylonitrile, 9 percent by weight of vinylacetate and 0.5 percent by weight of sodium p-sulfophenyl methallyl ether. Samples $L_1$ and $L_2$ were prepared in the presence of -ethylenediaminetetraacetic acid. No amino polyacid was employed in the preparation of samples $H_1$ and $H_2$.

The same tests as those specified in example 1, were carried out on samples $H_1$, $H_2$, $L_1$ and $L_2$ and the results of these tests were recorded on table II.

Similar results were obtained carrying out the polymerization in the presence of diethylenetriaminepentaacetic acid and nitrilotriacetic acid instead of ethylenediaminetetraacetic acid.

We claim:

1. In a process for the polymerization of vinyl monomers containing at least 80 percent acrylonitrile in the presence of a redox initiator system comprising chlorate ions and reducible sulfoxy ions at a pH of less than about 4 and at a chlorate to sulfoxy ratio of less than 1:6, the improvement which comprises conducting the polymerization in the presence of between 0.0001 percent and 5 percent, based on the weight of the monomers, an additive compound selected from the group consisting of ethylenediaminetetraacetic acid, diethylenetriaminepentaacetic acid, nitrilotriacetic acid and their water-soluble salts.

2. The improved process of claim 1 wherein the additive compound is ethylenediaminetetraacetic acid or a water-soluble salt thereof.

3. The improved process of claim 1 wherein the additive compound is diethylenetriaminepentaacetic acid or water-soluble salts thereof.

4. The improved process of claim 1 wherein the additive compound is nitrilotriacetic acid or water-soluble salts thereof.

5. An improved process for the polymerization of vinyl monomers containing at least 80 percent acrylonitrile which comprises feeding monomers, initiator system and additive compound to a reaction zone to form a reaction mixture in said zone wherein the temperature of said reaction mixture is maintained between 20° and 70° C. and the pH of said reaction mixture is maintained between 2 and 3.5, said initiator system being comprised of chlorate ions and reducible sulfoxy ions wherein said chlorate ions are maintained in a concentration lying between 0.1 and 2 percent based on the weight of the monomers and the ratio of chlorate ions to sulfoxy ions being maintained at a ratio between 1 to 8 and 1 to 12, said additive compound being present in the reaction mixture in a concentration ranging from 0.001 to 5.0 percent based on the weight of the monomers and being selected from the group consisting of ethylenediaminetetraacetic acid, diethylenetriaminepentaacetic acid, nitrilotriacetic acid and water-soluble salts thereof.

6. The process of claim 5 wherein the vinyl monomer feed is comprised of acrylonitrile.

7. The process of claim 6 wherein the vinyl monomer feed comprises at least about 80 percent by weight of acrylonitrile and up to about 20 percent by weight of vinyl acetate.

TABLE II

| Sample | Ethylenediaminetetraacetic acid, percent | $[\eta]$ Intrinsic viscosity | Conversion | Basic dyeability | Original color Purity index | Original color Brightness | Heat-sensitivity $\Delta PI$ | Heat-sensitivity $\Delta B$ |
| --- | --- | --- | --- | --- | --- | --- | --- | --- |
| $D_1$ | | 0.132 | 72.1 | 12.8 | 98.2 | 94.8 | 11.2 | 12.1 |
| $D_2$ | | 0.139 | 70.9 | 12.2 | 98.3 | 94.3 | 11.4 | 11.9 |
| $E_1$ | 0.01 | 0.150 | 70.3 | 11.1 | 96.5 | 96.2 | 9.7 | 9.9 |
| $E_2$ | 0.01 | 1.151 | 70.1 | 11.0 | 96.4 | 95.9 | 8.3 | 8.9 |
| $F_1$ | | 0.131 | 71.2 | 12.5 | 98.2 | 94.2 | 10.9 | 11.6 |
| $F_2$ | | 0.146 | 70.8 | 11.6 | 98.1 | 93.9 | 11.1 | 11.2 |
| $G_1$ | 0.01 | 0.153 | 70.0 | 11.2 | 96.4 | 95.7 | 8.1 | 9.1 |
| $G_2$ | 0.01 | 0.151 | 70.2 | 11.1 | 96.1 | 96.1 | 7.9 | 8.6 |
| $H_1$ | | 0.166 | 68.4 | 13.0 | 98.2 | 85.1 | 15.0 | 17.1 |
| $H_2$ | | 0.150 | 70.0 | 14.1 | 98.6 | 94.9 | 16.0 | 18.4 |
| $L_1$ | 0.01 | 0.151 | 70.1 | 14.2 | 99.3 | 96.2 | 12.7 | 12.9 |
| $L_2$ | 0.01 | 0.151 | 70.0 | 14.1 | 99.3 | 96.3 | 12.5 | 13.0 |